A. T. De Puy
Printers' Galley
No. 3,066. Reissued Aug. 4, 1868.
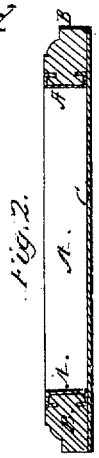
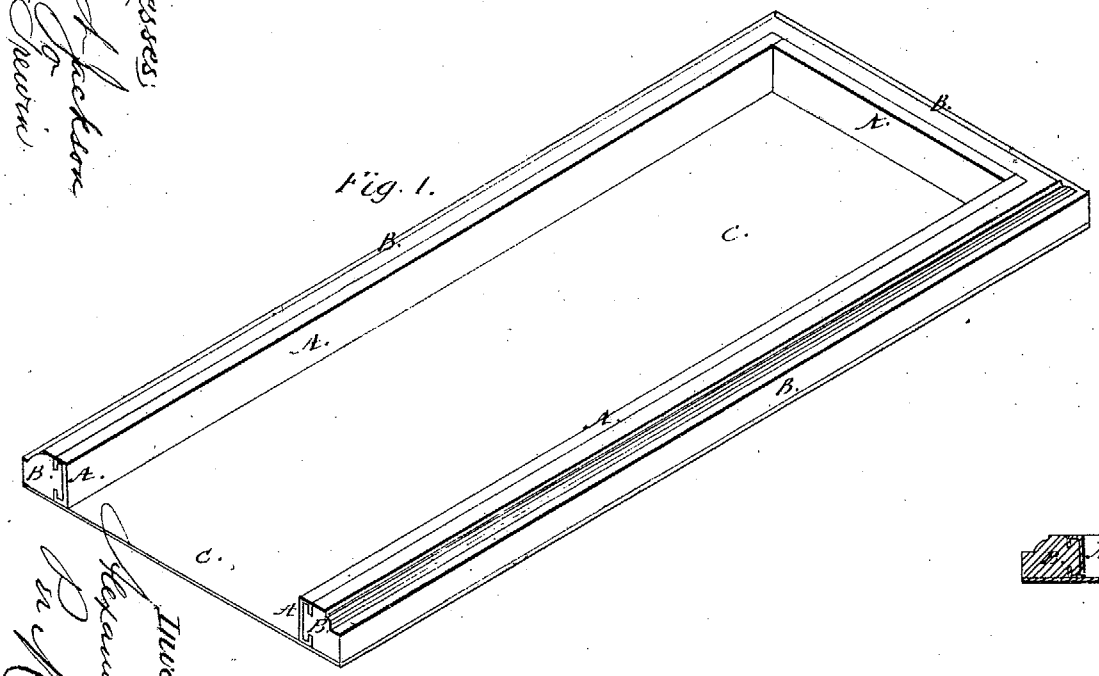
Witnesses;
F. A. Jackson
Wm. Trewin
Inventor;
Alexander J. De Puy
Per Munn & Co
Attorneys

UNITED STATES PATENT OFFICE.

R. HOE & CO., OF NEW YORK, N. Y., ASSIGNEES OF ALEXANDER T. DE PUY, OF SAME PLACE.

IMPROVEMENT IN PRINTERS' GALLEYS.

Specification forming part of Letters Patent No. 60,151, dated December 4, 1866; Reissue No. 3,066, dated August 4, 1868.

*To all whom it may concern:*

Be it known that ALEXANDER T. DE PUY, of the city, county, and State of New York, did invent a new and useful Improvement in Printers' Galleys; and we do hereby declare the following to be a full, clear, and exact description thereof, reference being had to the accompanying drawings, and figures and letters of reference thereon, making part of this specification.

Of the said drawings, Figure 1 is a perspective view of this improved printer's galley. Fig. 2 represents a vertical cross-section of the same.

Similar letters of reference indicate like parts in the drawings.

The object of this invention is to attach metallic strips of lining to the wooden parts forming a printer's galley, so that they may be held thereto without the aid of screws, nails, or other devices.

To this end the invention consists in so constructing the metallic strips that they may be forced into a groove or grooves, and held without other fastening.

Heretofore the metallic strips have been attached to the wooden portions of the galley by screws, which necessitated the drilling and countersinking of the metallic strips, the time of a workman to attach the lining to the wood, and reducing the screw-heads to a plane with the surface of the lining. The screws would soon lose their hold, and present an uneven surface for the type.

This invention obviates all these difficulties.

The top and bottom edges of the metallic strips or lining A are bent twice at right angles, so that the last bend is parallel to the main body of the plate. As seen in Fig. 2, grooves are cut into the bottom and top of the wooden ledges B, so that the last bend of the strip may fit the said grooves.

The strip A having thus been bent, and the grooves having been cut into the ledge B, the former is forced into the latter, when the whole ledge thus formed is ready to be attached to the bottom plate C of the galley. In this way we are enabled to construct the ledges in long pieces, and cutting them into the requisite lengths when finished, thus obtaining a very cheap and durable ledge for printers' galleys. The whole length of the metallic strips holding onto the wooden ledge at its top and bottom gives a very secure fastening.

The ledges B may be attached to the plate C in any well-known manner.

It will be obvious that other forms of bend in the metallic strips, and corresponding grooves or recess in the wood to receive the said strips, may be made to attain the same end—viz., the fastening of the metallic strips to the wooden portion of the galley without screws, nails, or other similar means, and still be within the scope and range of this invention. Therefore,

What is claimed as the invention of ALEXANDER T. DE PUY is—

The combination, with the wooden frame of a printer's galley, of a metallic lining secured thereto by means of a groove or grooves, substantially as and for the purpose specified.

R. HOE & CO.

Witnesses:

JOHN WEBB,

EDWARD E. OSBORN.